US009434885B2

(12) United States Patent
Mullen et al.

(10) Patent No.: US 9,434,885 B2
(45) Date of Patent: Sep. 6, 2016

(54) METHODS FOR PRODUCING BIO-OIL

(71) Applicant: The United States of America, as represented by the Secretary of Agriculture, Washington, DC (US)

(72) Inventors: Charles A. Mullen, Lansdale, PA (US); Akwasi A. Boateng, Royersford, PA (US); Neil M. Goldberg, North Wales, PA (US)

(73) Assignee: The United States of America, as Represented by the Secretary of Agriculture, Washington, DC (US)

( * ) Notice: Subject to any disclaimer, the term of this patent is extended or adjusted under 35 U.S.C. 154(b) by 335 days.

(21) Appl. No.: 13/777,020

(22) Filed: Feb. 26, 2013

(65) Prior Publication Data
US 2014/0238835 A1 Aug. 28, 2014

(51) Int. Cl.
*C10B 49/08* (2006.01)
*C10B 53/02* (2006.01)

(52) U.S. Cl.
CPC ............... *C10B 53/02* (2013.01); *C10B 49/08* (2013.01); *Y02E 50/14* (2013.01); *Y02P 20/145* (2015.11)

(58) Field of Classification Search
CPC ....... C10B 49/08; C10B 49/10; C10B 49/20; C10B 49/22; C10B 53/02
USPC .................. 201/29, 31, 43; 585/242, 240
See application file for complete search history.

(56) References Cited

U.S. PATENT DOCUMENTS

| 4,139,416 A * | 2/1979 | Palumbo et al. ............... 201/29 |
| 4,311,670 A | 1/1982 | Nieminen |
| 4,823,712 A | 4/1989 | Wormer |
| 7,905,990 B2 * | 3/2011 | Freel ............................... 201/12 |
| 8,100,990 B2 * | 1/2012 | Ellens et al. .................... 44/589 |
| 2011/0139602 A1 * | 6/2011 | Lin et al. ........................ 203/14 |

FOREIGN PATENT DOCUMENTS

| WO | WO9424228 | 10/1994 |
| WO | WO2012034141 | 3/2012 |

OTHER PUBLICATIONS

Zhang, H. et al., Biomass Fast Pyrolysis in a Fluidized Bed Reactor Under N2, CO2, CO, CH4, and H2 Atmospheres, Bioresource Technology, 2011, pp. 4258-4264, vol. 102.
Aho et al., "Catalytc Pyrolysis of Woody Biomass in a Fluidized Bed Reactor: Influence of the Zeolite Structure", Fuel, IPC Science and Technology Press, Guildford, GB, vol. 87, No. 12, Sep. 1, 2008, pp. 2493-2501.

* cited by examiner

*Primary Examiner* — Jill Warden
*Assistant Examiner* — Joye L Woodard
(74) *Attorney, Agent, or Firm* — John D. Fado; G. Byron Stover

(57) ABSTRACT

Methods for producing bio-oil from a feedstock (e.g., lignocellulosic) involving (1) pyrolyzing the feedstock in an inert atmosphere in a reactor to produce bio-oil, bio-char and non-condensable gases; (2) recycling 50 to about 85% of the non-condensable gases to the reactor to produce deoxygenated bio-oil; wherein the method is conducted in the absence of oxygen and wherein the method does not utilize externally added catalysts.

32 Claims, 6 Drawing Sheets
(5 of 6 Drawing Sheet(s) Filed in Color)

METHODS FOR PRODUCING BIO-OIL

BACKGROUND OF THE INVENTION

Methods for producing bio-oil from a feedstock involving (1) pyrolyzing the feedstock in an inert atmosphere in a reactor to produce bio-oil, bio-char and non-condensable gases; (2) recycling about 10 to about 99% of the non-condensable gases to the reactor to produce deoxygenated bio-oil; wherein the method is conducted in the absence of oxygen and wherein the method does not utilize externally added catalysts.

Fast pyrolysis has become the most promising method for production of liquid fuel intermediates from lignocellulosic biomass (Mohan, D. et al., Energy Fuels, 20: 848-889 (2006); Huber, G. W., et al., Chem Rev., 106: 4044-4098 (2006)). The pyrolysis process holds promise for utilization in small on-the-farm systems because of its smaller footprint and the logistical advantage of transporting dense liquids over bulky biomass (Wright, M., and R. C. Brown, Biofuels Bioref., 1: 191-200 (2007); Wright, M. et al., Biofuels Bioprod. Bioref., 2: 229-238 (2008)). However, it is well documented that biomass fast pyrolysis oils have compatibility issues with the current infrastructure, whether they are to be used for stationary boiler fuels or upgraded to hydrocarbon transportation fuels due to their high acidity and instability, problems mostly associated with high oxygen content. For that reason it has been the goal of many pyrolysis researchers to produce deoxygenated pyrolysis oils resulting in better characteristics for direct combustion and an easier path to "drop in" transportation fuels via various upgrading methods including a hydrotreating process.

To produce the desired deoxygenated fuel intermediates, many have focused on adding an oxygen rejecting catalyst to the pyrolysis process. Most of the reports on catalytic pyrolysis involve the use of solid acid catalysts such as zeolites to promote cracking type reactions (Mullen, C. A., et al., Energy Fuels, 25: 5444-5451 (2011); Mihalcik, D. A., et al., Eng. Chem. Res., 50: 13304-13312 (2011); Carlson, T. R., et al. ChemSusChem, 1: 397-400 (2008); Jae, T., et al., J. Catalysis, 279: 257-268 (2011); Cheng, Y. T., et al., Angew. Chem. Int. Ed., 51: 1387-1390 (2012); Williams, P. T. and N. Nugranad Energy, 25: 493-513 (2000)). The general mechanism by which these catalysts work are through protonation of oxygenates and generation of carbocations through dehydration. These reactions produce olefins which aromatize under the reaction conditions. However, the removal of hydrogen via these types of reactions from already hydrogen deficient feedstocks results in coke formation which reduces the carbon conversion to the liquid product and also deposits coke on the catalyst thereby deactivating it. Therefore reactor design for catalytic pyrolysis systems must provide for continual regeneration of catalysts which results in a more complex system than one for thermal only pyrolysis. These systems may require additional footprint, controls, expertise, and expense to run, and complicates the process of deploying an on-the-farm or mobile system of this type.

It is therefore desirable for the scale of interest to produce partially deoxygenated stable fuel intermediates without the use of limited lifetime catalysts.

We have found that when recycling volatile pyrolysis products are used as fluidizing gas and tuned to specific concentrations to provide a reducing reaction atmosphere, an autocatalytic effect can occur and partially deoxygenated pyrolysis oils are produced without the use of externally added catalysts.

SUMMARY OF THE INVENTION

Methods for producing bio-oil from a feedstock involving (1) pyrolyzing the feedstock in an inert atmosphere in a reactor to produce bio-oil, bio-char and non-condensable gases; (2) recycling about 10 to about 99% of the non-condensable gases to the reactor to produce deoxygenated bio-oil; wherein the method is conducted in the absence of oxygen and wherein the method does not utilize externally added catalysts.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
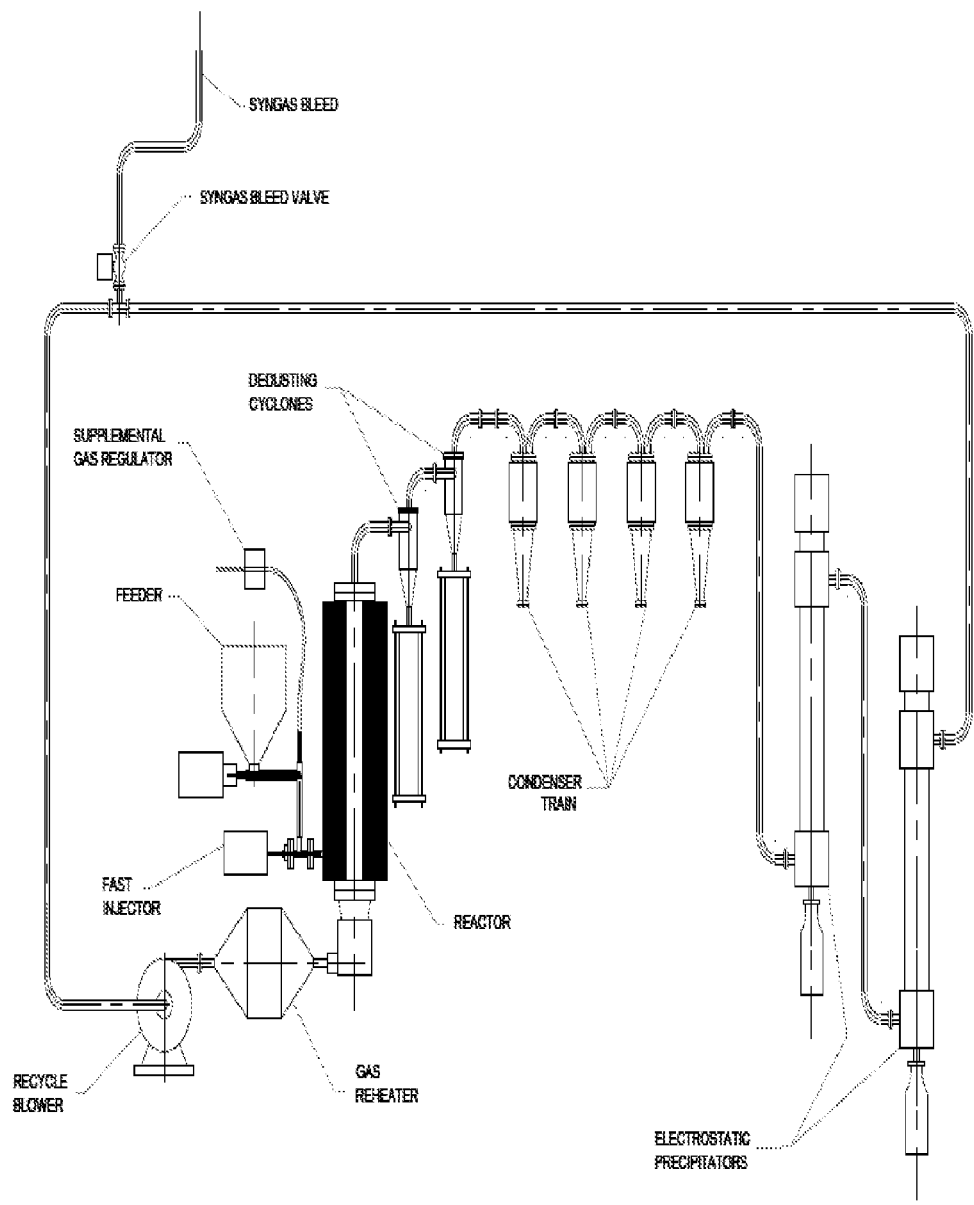
FIG. 1 shows a diagram of pyrolysis system designed for recycling of product gases for fluidization and reaction atmosphere as described below.

Disclosed are methods for producing bio-oil (e.g. partially deoxygenated) from a feedstock (e.g., lignocellulosic) involving (1) pyrolyzing the feedstock in an inert atmosphere in a reactor to produce bio-oil, bio-char and non-condensable gases; (2) recycling about 10 to about 99% of the non-condensable gases to the reactor to produce deoxygenated bio-oil; wherein the method is conducted in the absence of oxygen and wherein the method does not utilize externally added catalysts.

Feedstocks which may be utilized include, but are not limited to, lignocellulosic feedstocks such as white oak and other woods (including forestry residues), grasses such as switchgrass, and also crop residues such as corn stover or straws. Additional feedstocks include presscakes of mustard family seeds (family Brassicaceae; pennycress, camelina, canola) and of other oil seeds (e.g., canola, cottonseed or soybeans); presscake is the material left over after mechanical pressing of seeds to remove their vegetable oil. The main difference between these presscake feedstocks and mostly lignocellulosic comprised feedstocks such as wood or grass is the amount of protein present in the material. These presscake proteinaceous materials have been shown to produce higher quality pyrolysis oils (described above) but are less abundant and can have value as animal feeds in some cases.

In this study we examined the fluidized bed fast pyrolysis of three different types of biomass utilizing, varying amounts of the gases produced in the pyrolysis process as fluidizing gas and reaction atmosphere. The three feedstocks studied were oak, switchgrass and pennycress presscake. Oak and switchgrass have mostly lignocellulosic composition and are known to yield highly oxygenated, acidic, unstable pyrolysis oils upon traditional inert atmosphere pyrolysis (Mohan et al; Boateng, A. A., et al., Ind. Eng. Chem. Res., 46: 1891-1897 (2007)). They are also very abundant feedstocks for pyrolysis. Pennycress presscake is material left over after mechanical extraction of vegetable oils from the seeds of the pennycress plant, a member of the mustard family. The presscake is a highly proteinaceous material, and is different in composition and pyrolysis behavior than switchgrass or oak. Like some other types of proteinaceous biomass, pyrolysis of pennycress presscake yields a pH neutral, stable, partially deoxygenated but nitrogen rich liquid product (Boateng, A. A., et al., Energy Fuels, 24: 6624-6632 (2010); Mullen, C. A., et al, Bioenergy Research, 4: 303-311 (2011); Boateng, A. A., et. al., U.S. Pat. No. 8,317,883). In this study we have found that while the recycle gas atmosphere had a dramatic deoxygenation effect on the pyrolysis oils produced from switchgrass and white oak, little effect on the pyrolysis of pennycress presscake was observed. Zhang et. al. have reported production of pyrolysis oils with slightly enhanced energy content by utilizing externally added CO or $H_2$ as the reaction atmosphere (Zhang, H., et al., Bioresource Tech., 102: 4258-4264 (2011)), but the effect they reported was very small compared with the dramatic changes in product composition that we report here.

Pyrolysis can be performed on a bubbling fluidized bed pyrolysis system, for example see the one previously described by Boateng et al. (2007, 2010); alternatively, it is to be understood that analogous fast pyrolysis systems, comprising differences in the reactor processes (e.g., circulating fluidized beds, augur reactors or ablative reactors), or that utilize an alternative heat carrier, or different numbers or size of condensers, or different condensing means or precipitating means may be used for the preparation of the bin-oil. Pyrolysis can be conducted at a fluidized bed temperature of between about 450 and about 500° C. (e.g., 450° to 500° C.) and reaction/residence times from about 0.1 to about 5 seconds (e.g., 0.1 to 5 seconds; preferably about 0.1 to about 1 second (e.g., 0.1-1 second)). The biomass feed rates can be about 1 to about 3 kg/h (e.g., 1 to 3 kg/h; preferably about 1.5 kg/b (e.g., 1.5 kg/h)). Control of the temperatures, and feed rate and data collection can be accomplished through use of standard control systems (e.g., Siemens PCS7 control system). The pyrolysis reactor described above, a complete schematic of the system is provided in FIG. 1, can be modified for operation on recycled product gas by including a regenerative blower with an inlet, port connected to the ESP outlet to return ESP tail gases to the fluidized bed plenum upon reheating through an electric heater. A remotely controlled gas outlet valve in the blower inlet line allows for the discharge of the preheated returned gases to maintain a constant system volume. A pressure transmitter in the blower inlet line can be integrated with the control system to modulate the gas outlet valve. The regenerative blower can be sized to provide sufficient flow and head to fluidize the sand bed. The system can be flushed with an inert atmosphere (e.g., nitrogen) during heating to remove system air. A small amount of nitrogen (<0.5 L/min) may be required to flow into the feed drop tube to maintain a positive pressure throughout the system as well as to aid feedstock flow.

As noted above, the methods involve recycling about 10 to about 99% (e.g., 10-99%) of the non-condensable gases to the reactor, preferably about 40 to about 90% (e.g., 40-90%), preferably about 60 to about 85% (e.g., 60-85%), preferably about 65 to about 80% (e.g. 65-80%), preferably about 70% (e.g., 70%) non-condensable gases to said reactor to produce deoxygenated bio-oil.

Generally, the combination of benzene, toluene and xylene produced after recycling the non-condensable gases is about 5 times (e.g., 5 times; preferably about 10 times (e.g., 10 times), preferably about 15 times (e.g., 15 times), more preferably about 20 times (e.g., 20 times), and most preferably about 25 times (e.g., 25 times)) the combination of benzene, toluene and xylene produced with no recycling of the non-condensable gases, preferably Generally, the products produced after recycling the non-condensable gases have a C:O ratio of at least about 1.6 times (e.g., at least 1.6 times; preferably at least about 1.9 times (e.g., at least 1.9 times), more preferably at least about 4.3 times (e.g., at least 4.3 times), most preferably at least about 5.3 times at least 5.3 times)) the C:O ratio of products produced with no recycling of the non-condensable gases.

Generally, the products produced after recycling the non-condensable gases contain about 70% (e.g., 70%; preferably about 50% (e.g., 50%)) of the $CO_2$ compared to products produced with no recycling of the non-condensable gases.

Generally, the products produced after recycling the non-condensable gases contain about two tittles (e.g., two times; preferably about 20 times 20 times)) more $H_2$ compared to products produced with no recycling of the non-condensable gases.

Generally, the products produced after recycling the non-condensable gases contain about two times (e.g., two times; preferably about six times (e.g., six times)) more $CH_4$ compared to products produced with no recycling of said non-condensable gases.

Generally, the products produced after recycling said non-condensable gases contain about 1 mole % (e.g., 1 mole %; preferably about 2.7 mole % (e.g., 2.7 mole %)) $C_2H_6$ compared to products produced with no recycling of said non-condensable gases which contained about 0 to about 0.4 mole % $C_2H_6$.

Generally, the products produced after recycling, said non-condensable gases contain about 1 mole % (e.g., 1 mole %; preferably about 2.6 mole % (e.g., 2.6 mole %)) $C_3H_8$ compared to products produced with no recycling of the non-condensable gases which contain about it to 0.1 mole % $C_3H_8$.

Generally, the products produced after recycling the non-condensable gases contain about 1.6 to about 2.8 times more (e.g., 1.6 to 2.8 times) MJ/kg compared to products produced with no recycling of the non-condensable gases.

Unless defined otherwise, all technical and scientific terms used herein have the same meaning as commonly understood by one of ordinary skill in the art to which the invention belongs. The term "about" is defined as plus or minus ten percent; for example, about 100° C. means 90° C. to 110° C. Although any methods and materials similar or equivalent to those described herein can be used in the practice or testing of the present invention, the preferred methods and materials are now described.

The following examples are intended only to further illustrate the invention and are not intended to limit the score of the invention as defined by the claims.

EXAMPLES

Feedstocks: The pyrolysis feedstocks were white oak, switchgrass, and pennycress presscake. Or was received as pellets and ground and sieved to 2 mm using a Wiley mill. Switchgrass was provided by a farm in Southeastern PA, and was also ground to 2 mm using a Wiley mill, Pennycress presscake was provided by ARS-NCAUR (Peoria, Ill.) and similarly sized to 2 mm. Elemental analysis of the feedstocks used is provided in Table 1.

Pyrolysis Experiments under $N_2$: Pyrolysis experiments were performed on a fluidized bed pyrolysis system previously described by Boateng et al. (2007, 2010). The reactor bed consisted of a 7.6 cm diameter pipe and filled to a depth of 20 cm with the fluidizing medium (sand or catalyst). Char removal was accomplished by cyclone separation and pyrolysis liquids were collected at four stations in a condensation train connected in series followed by an electrostatic precipitator (ESP). Non-catalytic pyrolysis experiments under an $N_2$ atmosphere were conducted as control experiments. Catalytic pyrolysis experiments on oak over β-zeolite type catalysts have been previously described (Mullen et al., 2011). Catalytic pyrolysis experiments on switchgrass over HZSM-5 were done by modification of the method described in Mullen et al. (2011) to regenerate the catalyst after 30 min (~0.75 kg biomass feed) of run time. Pyrolysis experiments were conducted at a fluidized bed temperature of between 450 and 500° C., and the biomass feed rates were about 1.5 kg/h. Control of the temperatures, and feed rate and data collection were accomplished through use of a Siemens PCS7 control system.

Pyrolysis Experiments with Recycling of Product Gases: The pyrolysis reactor described above, a complete schematic of the system is provided in FIG. 1, was modified for operation on recycled product gas by including, a regenerative, blower with an inlet port connected to the ESP outlet to return ESP tail gases to the fluidized bed plenum upon reheating through an electric heater. A remotely controlled gas outlet valve in the blower inlet line allowed for the discharge of the preheated returned gases to maintain a constant system volume. A pressure transmitter in the blower inlet line was integrated with the Siemens PCS7 system to modulate the gas outlet valve. The regenerative blower is sized to provide sufficient flow and head to fluidize the sand bed. The system was flushed with nitrogen during heating to remove system air. A small amount of nitrogen (<0.5 L/min) was required to flow into the feed drop tube to maintain a positive pressure throughout the system as well as to aid feedstock flow.

Pyrolysis product yield distribution was determined gravimetrically and corrected for material imbalance caused by product deposition in the system by using a nonlinear programming optimization model. This was developed to adjust the experimental data to achieve closed balances without losing the overall representation of the pyrolysis process while keeping within the law of conservation of mass (Boateng, A. A. et al., Energy Resources Tech., 134: 04200-1-042001-9 (2012)). Non condensable gas (NCG) composition was measured online using an Agilent 3000 MicroGC. Gas collected in a glass bulb set in the exhaust line for identification of components not measured by the micro GC was done using an Agilent 6890N gas chromatograph (GC) equipped with an Agilent 5973 mass spectrometer detector using a 60 m×0.25 mm CP-PoraBond Q fused silica capillary column (Varian. Palo Alto, Calif.) and using the following program 3 min at 35° C., then ramped at 5° C./ruin, up to 150° C., followed by 10° C./min up to 250° C.

Pyrolysis Oil Characterization: The elemental analysis of feedstock and product streams was carried our using a Thermo EA1112 CHNS/O analyzer. Water content was measured using Karl-Fischer titration in methanol with Hydranal Karl-Fischer Composite 5 (Fluka) used as titrant. Total acid number (TAN) was measured using a Mettler T70 automatic titrator using 0.1 M KOH in isopropanol as titrant and wet ethanol as the titration solvent. GC with mass spectroscopy (MS) detection analysis of pyrolysis it was performed on a Shimadzu GCMS QC-2010. The column used was a DB-1701, 60 m×0.25 ram, 0.25 μm film thickness. The oven temperature was programmed to hold at 45° C. for 4 min, ramp at 3° C./min to 280° C., and hold at 280° C. for 20 min. The injector temperature was 250° C., and the injector split ratio set to 30:1. The flow rate of the He carrier gas was 1 mL/min. The pyrolysis oil samples for CC analysis were prepared as 3±1 wt. % solutions in acetone which were filtered through a 0.45 μm polytetrafluorethylene (PTFE) filters prior to injection. For quantification of individual pyrolysis oil compounds, response factors relative to the internal standard, fluoroanthene were determined using authentic compounds (Mullen, C. A., et al., Energy Fuels, 22: 2104-2109 (2008)).

Figure 2:
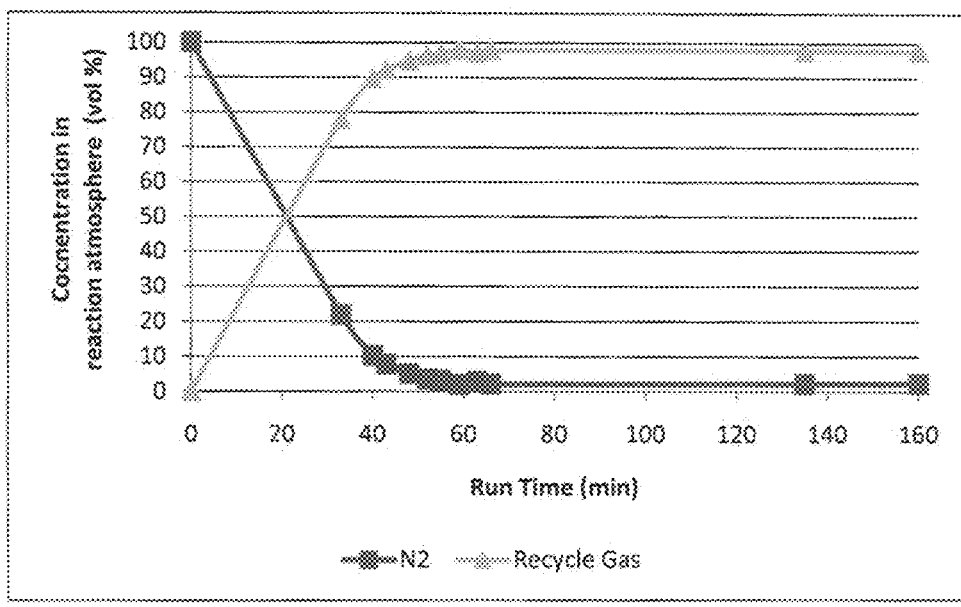
FIG. 2 shows an example profile of changing concentration of $N_2$ and recycle gas in reaction atmosphere as described below.

Results and Discussion, Reaction Atmosphere: As described in the experimental section above, the product gas recycling system was designed to direct a minimum amount of gas to the reactor to achieve fluidization of the sand bed. Prior to the beginning of the experiment fluidization was achieved by looping $N_2$ through the system. When feeding of biomass to the pyrolysis system began the concentration of $N_2$ in the system decreased as pyrolysis vapors were formed. Excess gas was bled off and analyzed by GC. An example profile of the reaction atmosphere is given in FIG. 2. For oak and switchgrass the composition of the produced gases surprisingly changed when using recycle gas as the fluidizing gas and reaction atmosphere compared to the control experiments in full $N_2$ stream; the composition quickly reached equilibrium and the ratio of $N_2$ to product gases did not have as much of an effect on the composition of the produced gas. Those equilibrium concentrations are provided on a $N_2$ free basis in Table 2 (trace generally means less than 0.1 wt %). Compared with the gas produced in the control, experiments, the gases produced under the recycle atmosphere had a surprisingly higher concentration of $H_2$, $CH_4$, and other hydrocarbons with a diminishing concentration of $CO_2$ in the gas. Chemically the difference between the control ($N_2$) atmosphere and one with high concentrations of $H_2$, CO, and hydrocarbons was the reducing nature of the later rather than the inertness of the $N_2$ atmosphere. Due to its composition, the produced gas from the recycling experiments also surprisingly had a much higher fuel value, than that produced in the control reactions. For oak the Higher Heating Value (HHV) of the gas fraction surprisingly increased from 5.5 to 11.4 MJ/kg when the atmosphere shifted from the $N_2$ to the optimum recycled gas atmosphere. For switchgrass it surprisingly increased from 7.7 to 12.4

MJ/kg. Because of the increased gas fuel value and $N_2$ depletion, ignition of the gas was possible, thus this gas could be used to provide some of the heat necessary for the pyrolysis process. In comparison to oak and switchgrass, for the pyrolysis of pennycress presscake the recycled atmosphere also had an effect on the composition of the gases: an increase in $H_2$ and a higher fraction of $CO_2$ was observed. Unlike the gases produced from the oak and switchgrass feedstocks, the gas from pennycress presscake still contained >48 mol % $CO_2$ and the fraction of CO in the gas remained at only about 24 mol %, The HHV of the product gases for pennycress surprisingly increased from 2.3 MJ/kg under $N_2$ to 6.5 MJ/kg at the optimum recycled condition.

Summarizing Table 2: The products produced from oak after recycling the non-condensable gases contained (compared to products produced with no recycling of the non-condensable gases ($N_2$ atmosphere)) about 44% of the $CO_2$ content, contained about 22.4 times more $H_2$ contained about 23 times more $CH_4$, contained about 0.9 mol % $C_2H_6$, contained about 1 mol % $C_3H_8$, and about 2.1 times the HHV (MJ/kg). The products produced from switchgrass after recycling the non-condensable gases contained (compared to products produced with no recycling, of the non-condensable gases ($N_2$ atmosphere)) about 53% of the $CO_2$ content, contained about 2.6 times more $H_2$, contained about 2 times more $CH_4$, contained about 1.1 mol % $C_2H_6$, contained about 0.8 mol % $C_3H_8$, and about 1.62 times the HHV (MJ/kg). The products produced from pennycress presscake after recycling the non-condensable gases contained (compared to products produced with no recycling of the non-condensable gases ($N_2$ atmosphere)) about 70% of the $CO_2$ content, contained about 1.8 times more $H_2$, contained about 5.7 times more $CH_4$, contained about 2.7 mol % $C_2H_6$, contained about 2.6 mol % $C_3H_8$, and about 2.77 times the HHV (MJ/kg).

In addition to the permanent gases produced from the pyrolysis of the biomass, the recycle gas stream also contained a certain amount of condensable volatile compounds that escaped the condensation system. Because these compounds were not detected by the on-line Micro GC, some gases were collected in a glass bulb or condensed in an additional −15° C. condenser added downstream of the ESP for off-line analysis during a switchgrass pyrolysis experiment. The offline analysis indicated that in addition to permanent gases, the recycle is stream also contained water, butenes, pentenes, acetic acid, acetone, propanal, furan, benzene, and toluene (see Tables 6-8). Without being bound by theory, the presence of some of these compounds, especially acids, could influence the chemistry of the pyrolysis process and could provide insight into the observed differences in the products between the control and product gas atmospheres.

Figure 3:
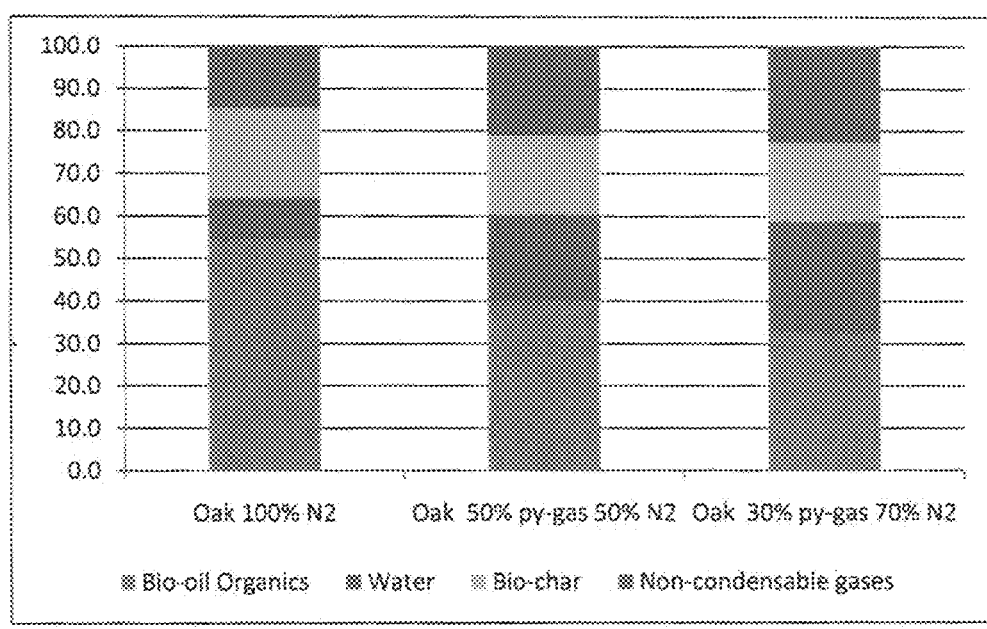
FIG. 3 shows yield distribution of pyrolysis products for oak under varying concentrations of recycled product gas as described below.
Figure 4:
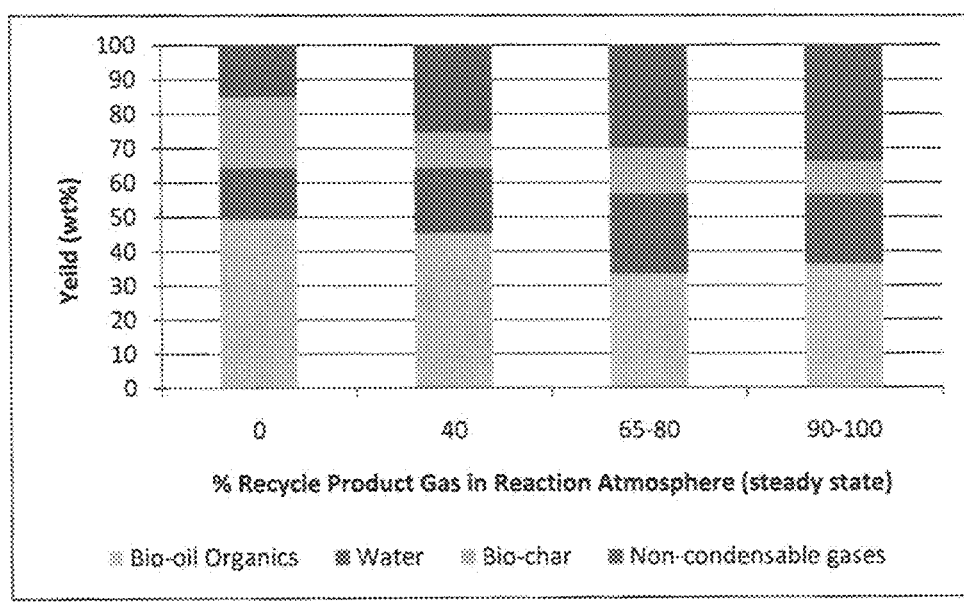
FIG. 4 shows yield distribution of pyrolysis products for switchgrass under varying concentrations of recycled product gas as described below.
Figure 5:
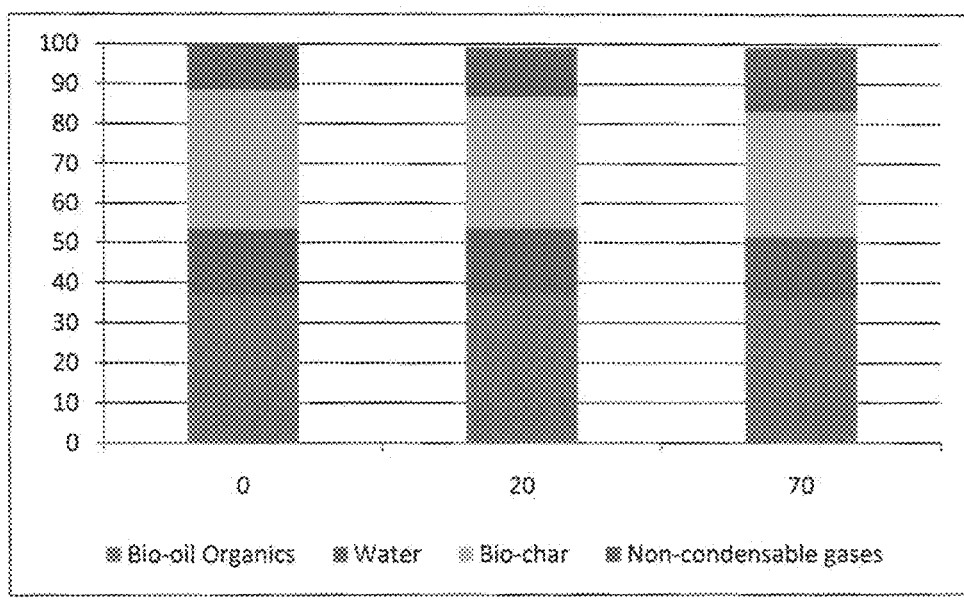
FIG. 5 shows yield distribution of pyrolysis products for pennycress presscake under varying concentrations of recycled product gas as described below.

Yield Distribution of Pyrolysis Products: The effect of utilizing recycled product gases on the yield distribution of pyrolysis products for the three feedstocks studied is shown in FIGS. 3, 4, and 5 for switchgrass, oak, and pennycress presscake respectively. For both switchgrass and oak, there was an increase in the production of non-condensable gases and water going from the neutral $N_2$ atmosphere (base case) to the reductive atmosphere of the recycle gas, with a concurrent drop in production of organic liquid product. This was a similar trend in yield distribution observed when comparing thermal-only fast pyrolysis (base case) with fast pyrolysis performed over a solid acid catalyst like such as a zeolite [4-10]. For both oak and switchgrass these trends continued up until the concentration of product gases in the reaction atmosphere reached about 70%. For oak, surprisingly the amount of NCG produced increased from 13 wt % of input biomass for pyrolysis reactions under $N_2$ to 26 wt % when the concentration was 70%, and the increase in water production went from 7.8% to 26% while the organic yield decreased from 54% to 32%. Experiments with switchgrass surprisingly followed similar trends with NCG increasing from 22% to 33%, water increasing from 14% to 20%, and organic liquid yield decreasing from 49% to 33%; however, when the concentration of the recycle gas reached between 90-99% of the atmosphere, a diminished effect was noticed where the distribution of non-condensable gas produced continued to increase (to 36%) but less water was produced (down to 20%) and the organics remaining increased slightly to 36%, thereby indicating a maximum or peak recycle as concentration where the greatest effect occurs. For pennycress presscake, the change in atmosphere had little effect on the pyrolysis product distribution (FIG. 5) which remained at about 36% organic, liquid, 16% water, 30-35% bio-char, and 11-16% non-condensable gases.

Pyrolysis Oil Characterization: The effect of the surprising increase in production of water and carbon oxides that occurred under the reductive atmosphere constituted to a surprising net removal of oxygen from the organic liquid product remaining. While this decreased the mass yield of organic liquid product, removal of oxygen from the liquid product stream surprisingly increased the product quality in terms of homogeneity, acidity, and energy content. The elemental analysis, total acid number, and energy content of the organic liquids collected via the ESP were typical indicators of this effect: Tables 3 through 5 present such results for oak, switchgrass, and pennycress presscake respectively. Due to the increase in water yields, the liquid fractions collected in the four condensers for the optimum recycled gas conditions was mostly water (>85%) while the great majority of organic product was collected via the ESP. All such further discussion of the results will be confined to the ESP products. These results were compared to zeolite catalyzed fast pyrolysis products to elucidate the importance of the findings presented herein. For oak, going from the base-case of 100% $N_2$ atmosphere to approximately 50:50 tail gas-N, atmosphere surprisingly resulted in an increase in the C/O ratio of the liquid, product from 2.2 to 3.6, thereby increasing the higher heating value from 23.7 to 31.2 MJ/kg. Introducing more of the reducing atmosphere, up to a concentration of 70% of the atmosphere, surprisingly resulted in a liquid product which contained <10 wt % O, had a C/O ratio of 11.6, and an energy content of 34.0 MJ/kg. However, the H/C ratio of the pyrolysis liquids trended downward from 1.26 to 0.88 at 70% recycle condition due to increase in water production. Additionally, it suggested that the liquid product produced under the reducing atmosphere was surprisingly highly aromatic in character, drawing a surprisingly strong similarity between these products and those from zeolite-catalyzed pyrolysis. We recently reported on the fast pyrolysis of oak over a β-type acid zeolite in the same system (Mullen et al, 2011) showing that under the best conditions a C/O ratio of 5.9, an H/C ratio of 0.9, and a dry basis HHV of 32.3 MJ/kg were realized.

In the case of switchgrass, trends similar to those for oak were observed in the C/O, C/H, HHV, and TAN values of the liquid products. Introducing the product gases into the atmosphere at about 40% concentration surprisingly resulted in an increase in the C/O ratio of the liquid product from 2.0 to 3.0 and the dry basis FUN of the product increased from 23.4 to 26.3 MJ/kg when compared with the neutral atmosphere. Increasing the concentration of the product gases to concentrations ranging from 65-80% of the atmosphere surprisingly resulted in further increase in C/O ratio to ~8.5. As was observed with oak, the H/C ratio decreased down from 1.21 to 1.12 to 0.85 for atmospheres containing 0, ~40 and 65-80% product gases, consistent with the observed increase in $H_2O$ and $H_2$ production observed. An observation that demonstrates the increased hydrocarbon character and hydrophobicity of these products compared to the base-case was that the liquid product produced became biphasic at a water content of only ~5% whereas pyrolysis oils are usually hydrophilic enough to remain homogenous at water contents up to 25 wt % (Mohan et al. 2006). As with the yield trend, a diminished return was observed when atmospheres containing 90-99% recycled product gases were utilized; in these cases the average C/U ratio of the liquid product was 4.4, the H/C ratio was 1.00, and the average energy content was 29.7 MJ/kg.

Figure 6:
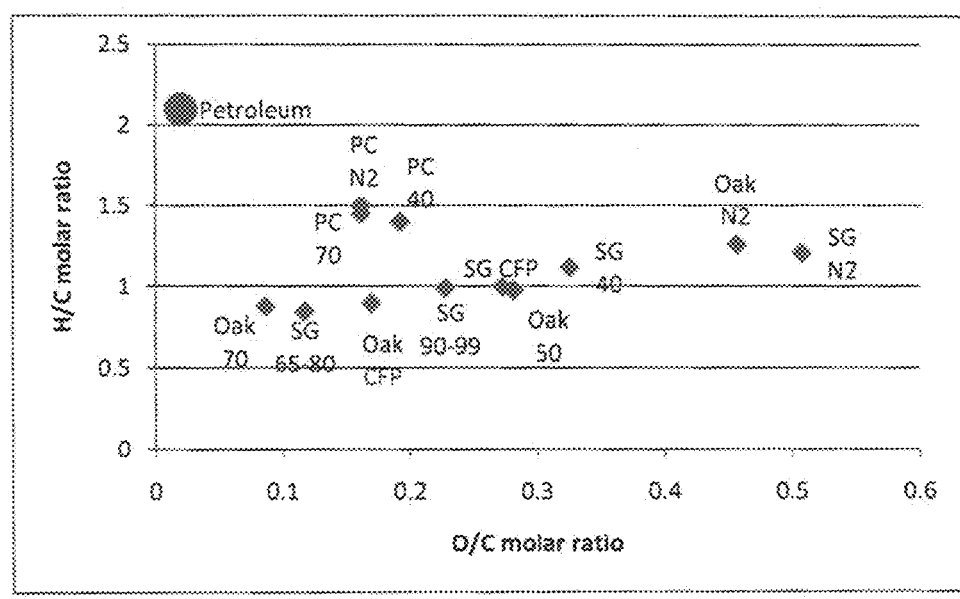
FIG. 6 shows Van Krevelen type diagram comparing oxygen and hydrogen contents of pyrolysis oils produced under varying concentrations of recycled product gases as described below. Numbers on data points indicate percentage of recycle gas in the atmosphere of the reaction at steady state. Data for petroleum and pyrolysis oils from catalytic fast pyrolysis over zeolites (CFP) provided for comparison. SG=switchgrass. PC=Pennycress presscake.

A summary comparison of the C, H, and O contents of these deoxygenated oils with neutral atmosphere thermal pyrolysis liquids, catalytic pyrolysis liquids, and petroleum is shown in the Van Krevelen type diagram shown in FIG. 6. The diagram in FIG. 6 has the molar O/C ratio on the horizontal axis and the molar H/C ratio on the vertical axis. It demonstrates that for switchgrass and oak, highly oxygenated pyrolysis oils were produced under an $N_2$ atmosphere. It also demonstrates that as the atmosphere was changed from $N_2$ to varying amounts of recycled gas atmosphere the O/C ratio decreased, as the data points appearing further to the left side of the diagram (closer to petroleum) indicate. It also demonstrates that the for switchgrass and oak, an atmosphere consisting of 65-80% recycle gas present resulted in highest level of deoxygenation, with those data points falling the furthest left on the diagram. Furthermore, it provides a comparison with the results of catalytic fast pyrolysis (CFP), indicating that a higher level of deoxygenation was achieved with this process at the optimum concentration of recycle gas without catalysts than was achieved via the common zeolyte catalyzed CFP process. It also demonstrates the lack of effect this process had in the case of pennycress presscake, where the data points are clustered together on the diagram, regardless of the makeup of the atmosphere.

Summarizing Table 3, the products produced from oak after recycling the non-condensable gases contained (compared to products produced with no recycling of the non condensable gases ($N_2$ atmosphere)) contained about 30% less water, contained about 4.8 wt % water, contained about 38% more carbon, contained about 80 wt % carbon, contained about 3 times more nitrogen, contained about 2 wt % nitrogen, contained about 75% less oxygen, contained about 9.2 wt % oxygen, had a C:O ratio of about 11.5, had a C:O ratio about 1.6 times greater (at 50% recycle gas) and about 5.3 times greater at 70% recycle gas), had a H:C ratio about 30% less, had a H:C ratio of about 0.9, had a HHV about 43% higher, had a HHV of about 34 MJ/kg, had a TAN about 60% lower, and had about 56 mg KOH/g.

Summarizing Table 4, the products produced from switchgrass, after recycling the non-condensable gases contained (compared to products produced with no recycling of the non-condensable gases (3\11 atmosphere)) contained about 48% less water, contained about 3 wt % water, contained about 34% more carbon, contained about 80 wt % carbon, contained about 63% more nitrogen, contained about 1.5 wt % nitrogen, contained about 70% less oxygen, contained about 12.5 wt % oxygen, had a C:O ratio of about 8.5, had a C:O ratio about 1.56 times greater (at 40% recycle gas), about 4.33 times greater (at 65-80% recycle gas), and about 2.33 times great (at 90-99% recycle gas), had a H:C ratio about 30% less, had a H:C ratio of about 0.8, had about a 42% higher HHV, had HHV of about 33 MJ/kg, TAN was about 80% lower, and had a TAN of about 24 mg KOH/g.

Summarizing Table 5, the products produced from pennycress presscake after recycling the non-condensable gases contained (compared to products produced with no yang of the non-condensable gases ($N_2$ atmosphere)) had about a 6% higher HHV, had HHV of about 33 MJ/kg, had a TAN about 10% lower, and had a TAN of about 76 mg KOH/g.

The chemical composition of the deoxygenated liquids produced from reductive atmosphere pyrolysis of oak and switchgrass were studied by quantitative analysis. Concentrations of some key compounds found in the pyrolysis liquids are provided in Tables 6, 7 and 8. Again, the results for the same analysis on liquid products from the catalytic pyrolysis over zeolite catalysts are provided er comparison purposes. Consistent with the trend in C/O ratio and energy content for oak and switchgrass, the concentration of highly oxygenated compounds such as acetic acid, acetol, and levoglucosan surprisingly decreased as the concentration of the product gases in the atmosphere becomes greater, up to about 0%. In fact, the total concentration of these three compounds surprisingly decreased from 47 wt % of the liquid to <1 wt % by going from a 100% $N_2$ atmosphere to an atmosphere containing about 70% recycled product gases for switchgrass, and for oak the concentrations of these compounds were surprising 18 wt % at 100% $N_2$ and 2 wt % at 70% recycled product gas. Concurrently, the formation of aromatic hydrocarbons such as benzene, toluene, xylenes, and naphthalenes was surprisingly observed, and the concentration of non-methoxylated phenols (phenol and cresols) surprisingly increased in the liquid product. For switchgrass, liquids produced at atmospheres containing between 65-80% product eases, surprisingly total benzene, toluene, and xylem (BTX) content was 4% and naphthalene was found in a concentration of 4% compared with only trace mints of BTX or naphthalene when produced under $N_2$. For oak the BTX concentration surprisingly was 2.5% with an atmosphere of about 70% recycled gas and naphthalene concentration was 2.4%, again up from nearly zero amount for liquids produced under $N_2$. As with the C/O ratios and energy content there was also a diminishing return observed for the decrease in oxygenates and the increase in hydrocarbons observed when switch was pyrolyzed under very high levels (90-99%) of product gas atmosphere. In the case of pennycress presscake, the change in product composition (Table 8) was less dramatic but similar trends were surprisingly observed including a slight increase in the presence of benzene and toluene and a decrease in acetic acid concentration.

These trends in product compositions were similar to changes observed in pyrolysis liquid products when comparing thermal-only and catalytically-produced pyrolysis liquids. As shown in Tables 5 and 6, the product composition of the pyrolysis oils produced non-catalytically under product gas atmospheres surprisingly compared favorably to those produced over the zeolite catalysts. Similarities between the two surprisingly included the presence of increased aromatic hydrocarbons and non-methoxylated phenolics and decreased concentrations of oxygenates. The major difference, was surprisingly the selectivity ratio or single ring aromatics (BTX) to two ring aromatics (naphthalenes) was higher for the liquids produced in the product gas atmosphere compared with catalytic pyrolysis which was more selective for formation of two ring naphthalenes, although other studies have found catalyst selective for single ring aromatics (Jae et al. 2010).

Summarizing Table 6: The products produced from oak after recycling the non-condensable gases contained (compared to products produced with no recycling of the non-condensable gases ($N_2$ atmosphere)) contained about 50% less acetic acid, contained about 2.3 wt % acetic acid, contained less than 0.1 wt % of acetol, contained less than 0.1 wt % of levoglucosan, contained about 3 wt % phenol, contained about 15 times more phenol, contained about 3.7 wt % cresol, contained about 9 times more cresol, contained about 2 wt % benzene, contained about 1 wt % toluene, contained about 2.4 wt % naphthalene, contained about 1 wt % 1-methyl naphthalene, and contained about 10 times (preferably about 15 times) the combination of benzene, toluene and xylem.

Summarizing Table 7: The products produced from switchgrass after recycling the non-condensable gases contained (compared to products produced with no recycling of the non-condensable gases ($N_2$ atmosphere)) contained about 95% less acetic acid, contained about 0.3 wt % acetic acid, contained less than 0.1 wt % (preferably zero) of acetol, contained less than 0.1 wt (preferably zero) of levoglucosan, contained about 8 times more phenol, contained about 3.8 wt % phenol, contained about 4 times more cresol, contained about 2.5 wt % cresol, contained about 2.4 wt % benzene, contained about 1 toluene, contained about 0.6 wt % xylene, contained about 4.3 wt % naphthalene, contained about 1 wt % 1-methyl naphthalene, and contained about 10 times (preferably about 15 times, more preferably about 20 times, and most preferably about 25 times) the combination of benzene, toluene and xylene.

Summarizing Table 8: The products produced from pennycress presscake after recycling the non-condensable gases contained (compared to products produced with no recycling of the non-condensable gases ($N_2$ atmosphere)) contained about 80% less acetic acid, contained about 0.5 wt % acetic acid, contained about 85% less levoglucosan, contained about 03 wt % levoglucosan, contained about 2 times more cresol, contained about 1 wt % cresol, contained about 7 times more benzene, contained about 0.7 wt % benzene, contained about 7 times more toluene, contained about 0.7 wt % toluene, contained about 2 times more xylene, and contained about 5 times the combination of benzene, toluene and xylene.

Conclusion: The recycle and selective utilization of pyrolysis product gases for fluidization and reaction atmosphere was studied for the pyrolysis of white oak, switchgrass, and pennycress presscake. This provided a reducing environment for the pyrolysis processes. In the cases of oak and switchgrass, biomasses that have highly lignocellulosic compositions, an autocatalytic deoxygenation effect was surprisingly observed that resulted in products that were significantly deoxygenated compared with those produced conventionally under an inert $N_2$ atmosphere. For pennycress presscake, a biomass that has significant amount of protein, the effect was much less pronounced. These deoxygenated pyrolysis liquids were surprisingly rich in aromatic hydrocarbons and had increased energy content. The pyrolysis liquids were surprisingly similar in composition and properties to those produced through zeolite catalyzed pyrolysis but without the use of externally added catalysts. This is a major advantage because it greatly simplifies the production of deoxygenated pyrolysis oils without issues of catalyst incorporation, lifetime, and regeneration.

All of the references cited herein, including U.S. patents, are incorporated by reference in their entirety. Also incorporated by reference in their entirety are the following references: Boateng. A. A., et al., Mass Balance, Energy and Energy Analysis of Bio-oil Production by Fast Pyrolysis, J. Energy Res. Tech., 134: 04200-1-042001-9 (2012); Mullen, C. A., and A. A. Boateng, Energy Fuels, 22: 2104-2109 (2008); U.S. Pat. No. 8,317,883 (Boateng et al., Production of stable pyrolysis bio-oil from mustard family seeds, mustard family seed presscake, and defatted mustard family seed presscake); U.S. Patent Application Publication 20100323435 (Boateng et al., Injection System for Bio-fuel Reactor); U.S. Patent Application Publication 20120241305 (Goldberg et al, Fast pyrolysis Catalytic Cracking pipe for Producing Bio-Oils).

Thus, in view of the above, there is described (in part) the following:

A method for producing bio-oil from a feedstock, said method comprising (or consisting essentially of or consisting of (1) pyrolyzing said feedstock in an inert atmosphere in a (bio-fuel) reactor to produce bio-oil, bio-char and non-condensable gases; (2) recycling about 10 to about 99% of said non-condensable gases to said reactor (replaces inert atmosphere) to produce deoxygenated bio-oil; wherein said method is conducted in the absence of oxygen and wherein said method does not utilize externally added catalysts (e.g., solid acid catalysts, zeolite catalysts).

The above method, wherein said method comprises recycling about 40 to about 90% of said non-condensable gases to said reactor to produce deoxygenated bio-oil. The above method, wherein said method comprises recycling about 60 to about 85% of said non-condensable gases to said reactor to produce deoxygenated bio-oil. The above method wherein said method comprises recycling about 65 to about 80% of said non-condensable gases to said reactor to produce deoxygenated bio-oil. The above method, wherein said method comprises recycling about 70% non-condensable gases to said reactor to produce deoxygenated bio-oil.

The above method, wherein the combination of benzene, toluene and xylene produced after recycling said non-condensable gases is about 5 times the combination of benzene, toluene and xylene produced with no recycling of said non-condensable gases. The above method, wherein the combination of benzene, toluene and xylene produced after recycling said non-condensable gases is about 10 times the combination of benzene, toluene and xylene produced with no recycling of said non-condensable gases. The above method, wherein the combination of benzene, toluene and xylene produced after recycling said non-condensable gases is about 15 times the combination of benzene, toluene and xylene produced with no recycling of said non-condensable gases. The above method, wherein the combination of benzene, toluene and xylene produced after recycling said non-condensable gases is about 20 times the combination of benzene, toluene and xylene produced with no recycling of said non-condensable gases. The above method, wherein the combination of benzene, toluene and xylene produced after recycling, said non-condensable gases is about 25 times the combination of benzene, toluene and xylene produced with no recycling of said non-condensable gases.

The above method according to claim 1, wherein the products produced after recycling said non-condensable gases have a C:O ratio of at least about 1.6 times the C:O ratio of products produced with no recycling of said non-condensable gases. The above method, wherein the products produced after recycling said non-condensable gases have a C:O ratio of at least about 1.9 times the C:O ratio of products produced with no recycling of said non-condensable gases. The above method according to claim 1, wherein the products produced after recycling said non-condensable gases have a C:O ratio of at least about 4.3 times the C:O ratio of products produced with no recycling of said non-condensable gases. The above method, wherein the products produced after recycling said non-condensable gases have a C:O ratio of at least about 5.3 times the C:O ratio of products produced with no recycling of said non-condensable gases.

The above method, wherein the products produced after recycling said non-condensable gases contain about 70% of the $CO_2$ compared to products produced with no recycling of said non-condensable gases. The above method, wherein the products produced after recycling said non-condensable gases contain about 50% of the $CO_2$ compared to products produced with no recycling of said non-condensable gases.

The above method, wherein the products produced after recycling said non-condensable gases contain about two times more $H_2$ compared to products produced with no recycling of said non-condensable gases. The above method, wherein the products produced after recycling said non-condensable gases contain about twenty times more $H_2$ compared to products produced with no recycling of said non-condensable gases.

The above method, wherein the products produced after recycling said non condensable gases contain about two times more $CH_4$ compared to products produced with no recycling of said non-condensable gases. The above method, wherein the products produced after recycling said non-condensable gases contain about six times more $CH_4$ compared to products produced with no recycling of said non-condensable gases.

The above method, wherein the products produced after recycling said non condensable gases contain about 1 mole % $C_2H_6$ compared to products produced with no recycling of said non-condensable gases which contained about 0 to about 0.4 mole % $C_2H_6$. The above method, wherein the products produced after recycling said non-condensable gases contain about 2.7 mole % $C_2H_6$ compared to products produced with no recycling of said non-condensable gases which contained about 0 to about 0.4 mole % $C_2H_6$.

The above method, wherein the products produced after recycling said non condensable gases contain about 1 mole % $C_3H_8$ compared to products produced with no recycling of said non-condensable gases which contain about 0 to 0.1 mole % $C_3H_8$. The above method, wherein the products produced after recycling said non-condensable gases contain about 2.6 mole % $C_3H_8$ compared to products produced with no recycling of said non-condensable gases which contain about 0 to 0.1 mole % $C_3H_8$.

The above method, wherein the products produced after recycling said non-condensable gases contain about 1.6 to about 2.8 times more MJ/kg compared to products produced with no recycling of said non-condensable gases.

The above method, wherein said feedstock is a lignocellulosic feedstock.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

Feedstock elemental composition (wt %)

| | | C | H | N | S | O | $H_2O$ | Ash |
|---|---|---|---|---|---|---|---|---|
| Oak | as is | 50.12 | 6.29 | 0.51 | 0.00 | 40.93 | 1.6 | 0.59 |
| | dry ash free | 51.23 | 6.43 | 0.52 | 0.00 | 41.83 | — | — |
| Switchgrass | as is | 46.55 | 5.75 | 0.48 | 0.00 | 42.02 | 2.60 | 2.63 |
| | dry ash free | 49.41 | 6.06 | 0.51 | 0.00 | 44.33 | — | — |
| Pennycress | as is | 44.79 | 5.32 | 5.66 | 1.25 | 28.504 | 3.06 | 12.67 |
| Presscake | dry ash free | 52.37 | 6.22 | 6.62 | 1.46 | 33.33 | — | — |

TABLE 2

Composition of Product Gases[a] (mol %)

| Feedstock | Atmosphere | CO | $CO_2$ | $H_2$ | $CH_4$ | $C_2H_6$ | $C_3H_8$ | HHV (MJ/kg) |
|---|---|---|---|---|---|---|---|---|
| Oak | $N_2$ | 45.6 | 46.6 | 1.0 | 6.6 | 0 | 0 | 5.47 |
| | recycle | 40.3 | 20.7 | 22.4 | 14.7 | 0.9 | 1.0 | 11.36 |
| Switchgrass | $N_2$ | 57.6 | 29.5 | 5.1 | 7.8 | 0 | 0 | 7.67 |
| | recycle | 54.6 | 15.7 | 12.0 | 15.6 | 1.1 | 0.8 | 12.41 |
| Pennycress | $N_2$ | 22.6 | 69.2 | 6.1 | 2.0 | 0.4 | trace | 2.33 |
| Presscake | recycle | 23.9 | 48.3 | 11.1 | 11.4 | 2.7 | 2.5 | 6.47 |

[a]other compounds detected in the recycle stream but not quantified include ethylene, propylene, butenes, acetone, acetic acid, propanal, furan, benzene, and toluene.

TABLE 3

Elemental analysis, energy content and TAN of Oak Pyrolysis Oils Produced under varying amounts of product gas atmosphere

| % recycle gas in reaction atmosphere | $N_2$ | 50 | 70 | Catalytic Pyrolysis β-type zeolite catalyst, $N_2$* |
|---|---|---|---|---|
| Water (wt %) | 6.95 | 6.79 | 4.79 | 7.7 |
| Carbon (wt %, db) | 58.10 | 67.37 | 80.24 | 76.5 |
| Hydrogen (wt %, db) | 6.11 | 5.51 | 5.88 | 5.63 |
| Nitrogen (wt %, db) | 0.70 | 1.90 | 2.07 | 0.38 |
| Oxygen (wt %, db) | 35.09 | 25.22 | 9.19 | 17.4 |
| C/O | 2.19 | 3.56 | 11.64 | 5.9 |
| H/C | 1.26 | 0.98 | 0.88 | 0.90 |
| HHV (MJ/kg, db) | 23.7 | 31.2 | 34.0 | 32.3 |
| TAN (mg KOH/g) | 138 | 115 | 55.8 | 68 |

*Mullen, C.A., et al., Energy Fuels, 25: 5444-5451 (2011)

TABLE 4

Elemental analysis, energy content and TAN of Switchgrass Pyrolysis Oils Produced under varying amounts of product gas atmosphere

| % Recycle Gas in atmosphere | $N_2$ | 40 | 65-80 | 90-99 | Catalytic Pyrolysis over HZSM-5, $N_2$ |
|---|---|---|---|---|---|
| Water (wt %) | 6.7 | 8.2 | 3.2 | 3.6 | 5.1 |
| Carbon (wt %, db) | 59.82 | 64.27 | 80.29 | 70.71 | 68.55 |
| Hydrogen (wt %, db) | 6.03 | 6.00 | 5.67 | 5.83 | 5.74 |

TABLE 4-continued

Elemental analysis, energy content and TAN of Switchgrass Pyrolysis Oils Produced under varying amounts of product gas atmosphere

| % Recycle Gas in atmosphere | N$_2$ | 40 | 65-80 | 90-99 | Catalytic Pyrolysis over HZSM-5, N$_2$ |
|---|---|---|---|---|---|
| Nitrogen (wt %, db) | 0.92 | 1.76 | 1.50 | 1.88 | 0.74 |
| Oxygen (wt %, db) | 40.46 | 27.88 | 12.54 | 21.43 | 24.97 |
| C/O | 1.97 | 3.07 | 8.53 | 4.39 | 3.67 |
| H/C | 1.21 | 1.12 | 0.84 | 0.99 | 1.00 |
| HHV (MJ/kg, db) | 23.4 | 26.3 | 33.2 | 29.0 | 29.7 |
| TAN (mg KOH/g) | 119 | 96 | 24 | 54 | 51 |

TABLE 5

Elemental analysis, energy content and TAN of Pennycress Presscake Pyrolysis Oils Produced under varying amounts of product gas atmosphere

| % Recycle Gas in atmosphere | N$_2$ | 20-30 | 65-80 |
|---|---|---|---|
| Water (wt %) | 7.7 | 7.7 | 10.2 |
| Carbon (wt %) | 69.01 | 66.40 | 68.37 |
| Hydrogen (wt %)$^a$ | 8.35 | 7.78 | 8.30 |
| Nitrogen (wt %) | 7.14 | 8.43 | 8.10 |
| Oxygen (wt %)$^b$ | 14.75 | 16.96 | 14.65 |
| C/O | 6.2 | 5.2 | 6.2 |
| H/C | 1.5 | 1.4 | 1.45 |
| HHV (MJ/kg) | 31.4 | 33.1 | 33.2 |
| TAN (mg KOH/g) | 84 | 85 | 76 |

TABLE 6

Concentrations (GC/MS, wt %) of selected compounds in Oak Pyrolysis Oils Produced under varying amounts of product gas atmosphere

| % recycle | N$_2$ | 50 | 70 | Catalytic Pyrolysis β-type zeolite catalyst, N$_2$* |
|---|---|---|---|---|
| acetic acid | 4.4 | 3.1 | 2.3 | 4.5 |
| furfural | 0.2 | Trace | 0.1 | 0.2 |
| acetol | 4.8 | 0.7 | Trace | 0.4 |
| levoglucosan | 9.0 | Trace | Trace | 3.5 |
| phenol | 0.2 | 1.4 | 3.0 | 1.0 |
| cresols | 0.4 | 2.1 | 3.7 | 1.5 |
| guaiacol | 0.2 | Trace | 0 | 0.1 |
| syringol | 0.1 | 0.1 | 0.1 | 0.3 |
| benzene | trace | 0.6 | 2.1 | 0.2 |
| toluene | 0.1 | 0.4 | 1.0 | 0.2 |
| xylenes | 0.1 | 0.2 | 0.2 | 0.4 |
| naphthalene | 0.1 | 0.2 | 2.4 | 1.60 |
| 1-methyl naphthalene | 0.1 | 0.2 | 1.0 | 2.6 |

*Mullen, C.A., et al., Energy Fuels, 25: 5444-5451 (2011)

TABLE 7

Cocentrations (GC/MS, wt %) of selected compounds in Switchgrass Pyrolysis Oils Produced under varying, amounts of product gas atmosphere

| | 0 | 40 | 65-80 | 90-100 | Catalytic Pyrolysis HZSM-5, N$_2$ |
|---|---|---|---|---|---|
| acetic acid | 6.4 | 4.89 | 0.27 | 2.99 | 0 |
| furfural | 0.18 | 0.19 | 0 | 0.07 | 0.04 |
| acetol | 5.6 | 6.47 | 0 | 1.19 | 0.19 |
| levoglucosan | 4.65 | 4.86 | 0 | 0.295 | 0.16 |
| phenol | 0.47 | 1.98 | 3.75 | 3.22 | 1.79 |
| cresols | 0.59 | 2.51 | 2.51 | 3.28 | 1.76 |
| guaiacol | 0.46 | 0 | 0 | 0 | 0 |
| 2,6-dimethoxyphenol | 0.38 | 0 | 0 | 0 | Trace |
| benzene | 0.05 | 0.89 | 2.47 | 2.22 | 0.30 |
| toluene | 0.04 | 0 | 0.97 | 0.65 | 0.275 |
| xylenes | 0.06 | 1.09 | 0.63 | 0.45 | 0.86 |
| naphthalene | 0 | 0.22 | 4.36 | 1.36 | 3.7 |
| 1-methyl naphthalene | 0 | 0.14 | 1.0 | 0.48 | 2.40 |

TABLE 8

Concentrations (GC/MS, wt %) of selected compounds in Pennycress Presscake Pyrolysis Oils Produced under varying amounts of product gas atmosphere

| % recycle | N$_2$ | 20-30 | 60-80 |
|---|---|---|---|
| acetic acid | 2.4 | 1.5 | 0.5 |
| furfural | 0 | 0 | 0 |
| acetol | 0 | 0 | 0 |
| levoglucosan | 2.0 | 0.2 | 0.3 |
| phenol | 0.3 | 0.3 | 0.4 |
| cresols | 0.5 | 0.5 | 1.0 |
| guaiacol | 0.1 | 0.1 | 0.1 |
| syringol | 0.1 | 0.1 | 0.1 |
| benzene | 0.1 | 0.1 | 0.7 |
| toluene | 0.1 | 0.3 | 0.7 |
| xylenes | 0.1 | 0.2 | 0.2 |
| naphthalene | 0 | 0.1 | 0.1 |
| 1-methyl naphthalene | trace | trace | trace |

We claim:

1. A method for producing bio-oil from a feedstock, said method comprising (1) pyrolyzing said feedstock in an inert atmosphere in a reactor to produce bio-oil, bio-char and non-condensable gases; (2) returning said non-condensable gases as a recycle gas to said reactor to produce deoxygenated bio-oil; wherein after (2) the atmosphere in said reactor comprises 50 to about 85% recycle gas and is held at steady state; wherein said method is conducted in the absence of oxygen and wherein said method does not utilize externally added catalysts; wherein said feedstock is a lignocellulosic feedstock; wherein benzene, toluene and xylene are produced after (2).

2. The method according to claim 1, wherein after (2) the atmosphere in said reactor comprises about 70% recycle gas.

3. The method according to claim 1, wherein the combination of benzene, toluene and xylene produced after (2) is about 5 times the combination of benzene, toluene and xylene produced with no recycling of said non-condensable gases after (1).

4. The method according to claim 1, wherein the combination of benzene, toluene and xylene produced after (2) is about 10 times the combination of benzene, toluene and xylene produced with no recycling of said non-condensable gases after (1).

5. The method according to claim 1, wherein the combination of benzene, toluene and xylene produced after (2) is about 15 times the combination of benzene, toluene and xylene produced with no recycling of said non-condensable gases after (1).

6. The method according to claim 1, wherein the combination of benzene, toluene and xylene produced after (2) is about 20 times the combination of benzene, toluene and xylene produced with no recycling of said non-condensable gases after (1).

7. The method according to claim 1, wherein the combination of benzene, toluene and xylene produced after (2) is about 25 times the combination of benzene, toluene and xylene produced with no recycling of said non-condensable gases after (1).

8. The method according to claim 1, wherein the bio-oil produced after (2) has a C:O ratio of at least about 1.6 times the C:O ratio of products produced with no recycling of said non-condensable gases after (1).

9. The method according to claim 1, wherein the bio-oil produced after (2) has a C:O ratio of at least about 1.9 times the C:O ratio of products produced with no recycling of said non-condensable gases after (1).

10. The method according to claim 1, wherein the bio-oil produced after (2) has a C:O ratio of at least about 4.3 times the C:O ratio of products produced with no recycling of said non-condensable gases after (1).

11. The method according to claim 1, wherein the bio-oil produced after (2) has a C:O ratio of at least about 5.3 times the C:O ratio of products produced with no recycling of said non-condensable gases after (1).

12. The method according to claim 1, wherein the non-condensable gases produced after (2) contain about 70% of the $CO_2$ compared to products produced with no recycling of said non-condensable gases after (1).

13. The method according to claim 1, wherein the non-condensable gases produced after (2) contain about 50% of the $CO_2$ compared to products produced with no recycling of said non-condensable gases after (1).

14. The method according to claim 1, wherein the non-condensable gases produced after (2) contain about two times more $H_2$ compared to products produced with no recycling of said non-condensable gases after (1).

15. The method according to claim 1, wherein the non-condensable gases produced after (2) contain about twenty times more $H_2$ compared to products produced with no recycling of said non-condensable gases after (1).

16. The method according to claim 1, wherein the non-condensable gases produced after (2) contain about two times more $CH_4$ compared to products produced with no recycling of said non-condensable gases after (1).

17. The method according to claim 1, wherein the non-condensable gases produced after (2) contain about six times more $CH_4$ compared to products produced with no recycling of said non-condensable gases after (1).

18. The method according to claim 1, wherein the non-condensable gases produced after (2) contain about 1 mole % $C_2H_6$ compared to products produced with no recycling of said non-condensable gases which contained about 0 to about 0.4 mole % $C_2H_6$ after (1).

19. The method according to claim 1, wherein the non-condensable gases produced after (2) contain about 2.7 mole % $C_2H_6$ compared to products produced with no recycling of said non-condensable gases which contained about 0 to about 0.4 mole % $C_2H_6$ after (1).

20. The method according to claim 1, wherein the non-condensable gases produced after (2) contain about 1 mole % $C_3H_8$ compared to products produced with no recycling of said non-condensable gases which contain about 0 to 0.1 mole % $C_3H_8$ after (1).

21. The method according to claim 1, wherein the non-condensable gases produced after (2) contain about 2.6 mole % $C_3H_8$ compared to products produced with no recycling of said non-condensable gases which contain about 0 to 0.1 mole % $C_3H_8$ after (1).

22. The method according to claim 1, wherein the non-condensable gases produced after (2) contain about 1.6 to about 2.8 times more MJ/kg compared to products produced with no recycling of said non-condensable gases after (1).

23. Deoxygenated bio-oil produced by the method according to claim 1; wherein said deoxygenated bio-oil after step (2) has an oxygen content of no more than 12.54 wt %/o (dry basis) and wherein said deoxygenated bio-oil has higher heating value of at least 33.2 MJ/kg.

24. The method according to claim 1, wherein said reactor is a bubbling fluidized bed pyrolysis system.

25. The method according to claim 1, wherein after step (2) the atmosphere in said reactor comprises about 65 to about 80% recycle gas wherein the recycle gas contains at least 40.3 mole % CO, at least 12 mole % $H_2$, and at most 20.7 mole % $CO_2$.

26. The method according to claim 1, wherein said deoxygenated bio-oil has an oxygen content of no more than about 12.5 wt % (dry basis).

27. The method according to claim 1, wherein said deoxygenated bio-oil has an oxygen content of no more than about 25.22 wt % (dry basis).

28. The method according to claim 1, wherein said deoxygenated bio-oil has higher heating value of at least 33.2 MJ/kg.

29. The method according to claim 1, wherein said deoxygenated bio-oil has higher heating value of at least 31.2 MJ/kg.

30. The method according to claim 1, wherein said method comprises recycling about 60 to about 85% of said non-condensable gases to said reactor to produce deoxygenated bio-oil.

31. The method according to claim 1, wherein said method comprises recycling about 65 to about 80% of said non-condensable gases to said reactor to produce deoxygenated bio-oil.

32. Deoxygenated bio-oil produced by the method according to claim 1; wherein said deoxygenated bio-oil after step (2) has an oxygen content of no more than 25.22 wt % (dry basis) and wherein said deoxygenated bio-oil has higher heating value of at least 31.2 MJ/kg.

* * * * *